United States Patent [19] [11] 3,845,550
Gooch et al. [45] Nov. 5, 1974

[54] METHOD OF MANUFACTURING A MAGNETIC HEAD

[75] Inventors: Beverley R. Gooch, Sunnyvale; Edward Schiller, San Jose, both of Calif.

[73] Assignee: Ampex Corporation, Redwood, Calif.

[22] Filed: Oct. 1, 1973

[21] Appl. No.: 402,298

Related U.S. Application Data

[60] Division of Ser. No. 265,939, June 23, 1972, , which is a continuation-in-part of Ser. No. 67,784, Aug. 28, 1970, abandoned.

[52] U.S. Cl. .................... 29/603, 360/121, 360/127
[51] Int. Cl. .................... G11b 5/42
[58] Field of Search ................ 29/603; 179/100.2 C; 340/174.1 F; 346/74 MC; 360/121, 125, 127

[56] References Cited

UNITED STATES PATENTS

| | | | |
|---|---|---|---|
| 3,246,383 | 4/1966 | Peloschek et al. | 29/603 |
| 3,369,292 | 2/1968 | Manders | 29/603 |
| 3,502,821 | 3/1970 | Duinker | 179/100.2 C |
| 3,579,214 | 5/1971 | Solyst | 29/603 X |

*Primary Examiner*—C. W. Lanham
*Assistant Examiner*—Carl E. Hall

[57] ABSTRACT

A method of constructing transducers is provided wherein a pair of rectangular ferrite blocks are processed to yield a plurality of magnetic heads, each having protective glass pockets formed thereon about the edges of the ferrite pole pieces which define the non-magnetic transducing gap. In its preferred form the process requires only a single glass bonding step which simultaneously bonds the material at the non-magnetic record/reproduce gap and forms the protective glass pockets. The glass pockets eliminate the detrimental effects of edge chipping and granular pull-outs adjacent the non-magnetic record/reproduce gap which tend to occur on magnetic heads fabricated from ferrites or other similarly brittle magnetic materials.

12 Claims, 9 Drawing Figures

PATENTED NOV 5 1974 3,845,550

SHEET 2 OF 2

METHOD OF MANUFACTURING A MAGNETIC HEAD

This application is a division of our copending application U.S. Ser. No. 265,939, filed June 23, 1972, which was itself a continuation of a then copending application U.S. Ser. No. 67,784, filed Aug. 28, 1970, now abandoned. In general, the present invention relates to magnetic record, reproduce and erase transducers, and more particularly to transducers formed of hard, brittle magnetic materials such as ferrites.

It is well known in the art that ferrite materials are highly advantageous when employed as cores of magnetic transducers or heads due to the hardness (which prolongs the head life) and the preferred electrical/-magnetic characteristics of this material. Equally well known are the disadvantages of ferrites with the principal shortcoming being their inherent brittleness. U.S. Pat. Nos. 3,249,700 and 3,354,540 are illustrative of the difficulties in this regard and certain heretofore proposed solutions for constructing ferrite magnetic heads. Typically, when ferrites are formed into the configuration dictated by the transducer design, there is a tendency for the material to chip or incur granular pull-outs along the edges of the structure. Sometimes the edge chipping is due primarily to a defect in the grain structure of the material, while at other times it is the result of physical abuse to which the head is subjected during operation of the magnetic recording transport. For example, in view of the above mentioned advantages of ferrites, it is desirable to employ this material for heads in rotary scan magnetic tape recorders adapted for recording certain relatively high frequency signals such as video signals. In such machines, one or more transducer heads are rotated at a high rate relative to the magnetic recording tape medium. The reoccurring physical shock to which magnetic heads are subjected in such equipment can cause rapid erosion of the ferrite material along the edges of the head face or tip which engages the tape. Similar problems are observed in connection with magnetic disc recording equipment. If the edge erosion in the form of either chipping or pull-outs occurs at the non-magnetic gap, the width of the magnetic track is reduced by a corresponding amount.

The protective glass techniques taught by the above noted U.S. Patents, while having certain advantages, have been found extremely difficult and expensive to practice and thus entirely unsatisfactory for any volume manufacturing operation. An alternative solution is illustrated in U.S. Pat. No. 3,243,521, wherein the edges of the magnetic transducer tip are rounded or beveled so as to eliminate the roughness of sharp edges and thereby minimize further edge chipping and erosion. However, even with this precaution, edge erosion may still take place, for example by reason of granular pull-outs from the material, a phenomenon due principally to an inherent defect in the structural integrity of the material. Furthermore, while head tips formed with rounded edges may serve to reduce deterioration while the head is relatively new, abrasive wear of the head tip face tends to cause the return of sharp edges and thus render the head tip again vulnerable to chipping.

Another difficulty which has been encountered in the use of ferrites for magnetic transducers also relates to the brittleness of the material, but in this instance in connection with the method by which the heads are constructed. For example, it is conventional to form ferrite transducers by a process in which a pair of elongate blocks of ferrite material, each having a rectangular cross section, are bonded together with a suitable gap spacer material being inserted therebetween, and thereafter sliced along planes normal to the elongate axis of the blocks to produce a plurality of magnetic heads from each pair of blocks. It will be appreciated that the slicing operation requires that the cutting tool, such as a diamond saw blade, pass through the non-magnetic gap formed between the bonded box. Accordingly, the ends of the non-magnetic gap of each resulting head segment are subjected to the weakening forces of the cutting operation. The weakening of the material in this manner, at the critical non-magnetic gap region, inceases the probability of eventual edge chipping and other types of material erosion at the gap.

Accordingly, it is an object of the present invention to provide a magnetic head configuration, adapted for economical mass manufacture, which to a large extent eliminates the detrimental effects of chipping and erosion along the face edges of heads formed of brittle magnetic materials such as ferrites.

It is a further object of the present invention to provide a novel and advantageous method of constructing magnetic heads having the above mentioned configuration.

In accordance with the present invention, each magnetic head is constructed so as to be provided with pockets of bonded glass material at each end of the non-magnetic gap. These glass pockets isolate the end portions of the gap from the weak edges of the ferrite core and thus insure the structure integrity of the gap. Moreover, head configuration such as this is achieved by a unique method of fabrication in which the non-magnetic gap of each of the resulting heads is formed by a glass bonding operation which is effected simultaneously with the formation of the protective glass islands or pockets. The herein described method of construction is adapted to the economic production of a large quantity of transducers in that a plurality of magnetic heads can be cut or sliced from a single pair of bonded blocks of ferrite material with one particular advantage of the present invention being that each head created by this block slicing operation is provided with the protective glass pockets already formed thereon. Thus, after the bonded ferrite blocks are sliced, there is no further processing of the individual heads other than that heretofore required of conventional magnetic heads formed by slicing a pair of bonded blocks. Additionally, by reason of the particular head configuration of the present invention, a significantly higher yield of transducers having acceptable gaps is realized from the block slicing operation.

These and other objects, features and advantages of the invention will become apparent from the following description and accompanying drawings disclosing the preferred embodiment of the invention, wherein.

Figure 1:
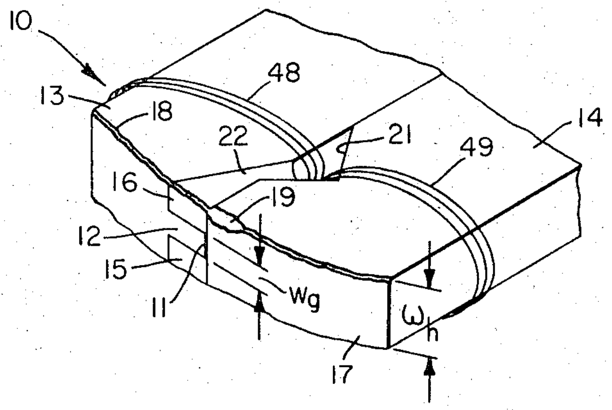
FIG. 1 is a perspective view of a head tip constructed in accordance with the present invention from a brittle magnetic material such as ferrite.

Referring to FIG. 1, the present invention provides a technique for fabricating a magnetic head 10 having a configuration in which the overall width $W_h$ of the head tip is greater than the desired width of the record track which is determined by the width $W_g$ of a non-magnetic record/reproduce gap 11. A relatively narrow extension 12 of a core member 13 provides one pole face abutting a pole face of another core member 14 at gap 11 to define the width $W_g$ thereof. Formed on either side of extension 12 are a pair of glass islands or pockets 16 and 15 of glass material physically bonded to the adjacent surfaces of member 13 and 14, and extending flush with the surrounding, non-contacting surfaces of the core members. For example, glass pockets 15 and 16 are flush with a head face 17 which is adapted to engage the recording medium, such as the surface of a magnetic tape. As the durability of the bonded glass within pockets 15 and 16 is substantial, there is provided a protective isolation between the corners of the ferrite material which define gap 11 and the core material which borders the edges of face 17, the latter being subject to chipping as indicated at 18 and granular pull-outs as indicated at 19. Accordingly, for the usual amount of edge erosion exhibited by head 10, gap 11 does not incur any loss in its effective track width and is not otherwise disturbed by crumbling of the ferrite material along the edges. The exposed edges of glass pockets 15 and 16 may incur some erosion along with the corresponding edges of the ferrite cores, however the strength of the glass is more than adequate to prevent the erosion from penetrating to gap 11 itself.

Each of the pockets 15 and 16 is formed so as to extend from head face 17 to communicate with a winding window 21 and the glass material and the bordering ferrite material are bonded throughout this region to form a highly durable integral body. As shown, the glass terminates within window 21 below a constricted region 22 bounded by spaced but adjacent walls of the separate core members 13 and 14.

Additional advantages have been found to flow from this head construction in that the increased width dimension of face 17 reduces the unit pressure between the head tip and magnetic recording medium and thus is believed to be responsible for a measured reduction in the electrical noise appearing in the output from the head. The principal source of electrical noise in such heads is believed to be due to magnetostriction, a pressure sensitive phenomenon. Furtherstill, a marked increase in headlife is observed, due to a decrease in the rate of head wear provided by the lower unit pressure of the head against the recording medium.

Figure 2:
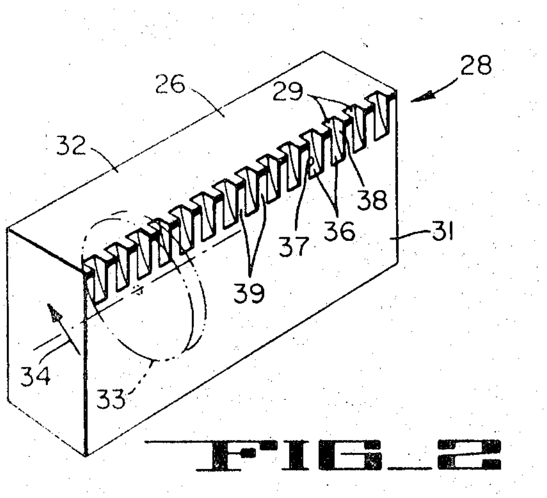
FIG. 2 is a perspective view of one of the blocks of magnetic material at a certain early stage of fabrication in accordance with the present invention.
Figure 3:
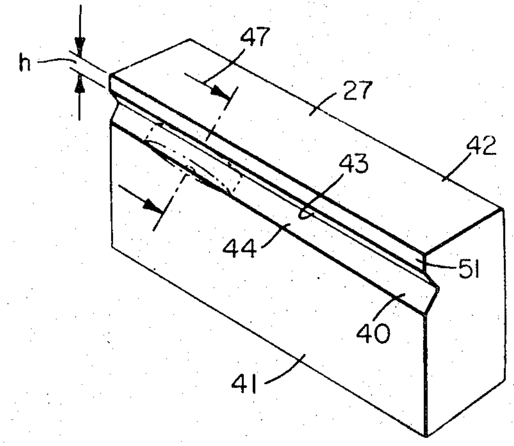
FIG. 3 is a perspective view illustrating the configuration of the other block of magnetic material which is eventually bonded to the block shown by FIG. 2.
Figure 4:
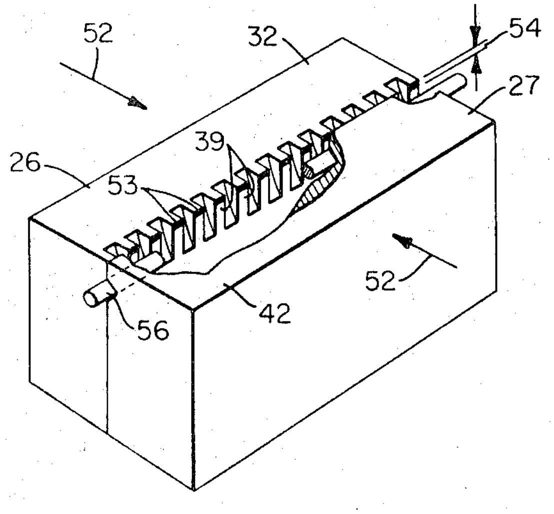
FIG. 4 is a perspective view showing the manner by which the blocks of magnetic material of FIGS. 2 and 3 are pressed together for the glass bonding operation.

An important advantage of the present invention relates to the large number of magnetic heads having the configuration indicated by FIG. 1, which can be produced with efficiency in terms of the time consumed by the fabrication process, the amount of materials employed in obtaining the final product, and the high percentage yield of acceptable heads from the starting materials. With reference to FIGS. 2, 3 and 4, the initial steps in the presently preferred fabrication process involve the preparation of a pair of elongate, rectangular cross section blocks 26 and 27 of magnetic core material, wherein these blocks eventually become core members 13 and 14, respectively, of head 10. Blocks 26 and 27 are originally of the same dimensions, typically a third to a quarter of an inch long, an eighth of an inch high and three sixteenths of an inch wide, as cut from the stock ferrite material.

With reference to FIG. 2, an edge 28 of block 26 is provided with a plurality of spaced parallel notches 29, which intercept a surface 31 and a top surface 32 adjacent and perpendicular thereto. In practice, notches 29 are formed by guiding a rotationally driven abrasive wheel 33 (shown in phantom) with its axis along a path indicated by arrow 34, such that the cutting edge of wheel 33 passes through edge 28 as shown. Notches 29 can be cut one at a time or simultaneously by a ganged cutter formed of a plurality of cutting devices such as abrasive wheel 33. Accordingly, in this instance each of notches 29 is defined by a bottom wall 36 extending in a plane parallel to path 34, and a pair of sidewalls 37 and 38. Notches 29 in turn define a plurality of lands 39 having faces coplanar with surface 31 where each of lands 39 will form a pole face for an individual non-magnetic gap such as gap 11 of FIG. 1.

With reference to FIG. 3, block 27, which provides the magnetic material from which core member 14 of FIG. 1 is formed, is provided with a groove 40 extending along the elongate axis of block 27 on a surface 41 thereof adjacent a top surface 42 at right angles thereto, wherein surfaces 41 and 42 of block 27 correspond in dimensions to surfaces 31 and 32 respectively of block 26. While the configuration of groove 40 is not critical, in this instance it is formed by two right angled walls 43 and 44 inwardly converging from surface 41, wherein this configuration is provided by the cutting action of an abrasive wheel 46, shown in a phantom. The axis of wheel 46 is oriented at approximately a 45°angle relative to surface 41 and is drawn along a block 27 in a direction indicated by arrow 47.

Figure 6:
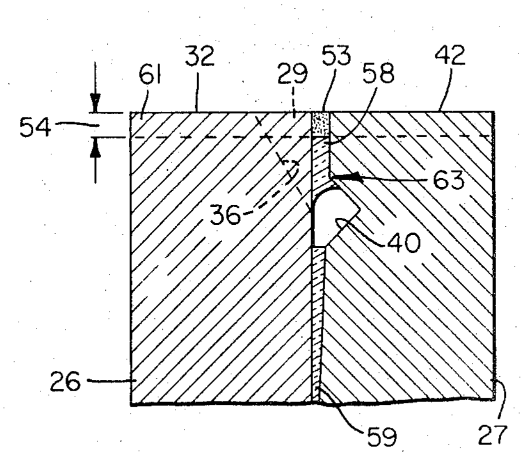
FIG. 6 is a cross section view of the bonded blocks taken along lines 6—6 of FIG. 5.
Figure 8:
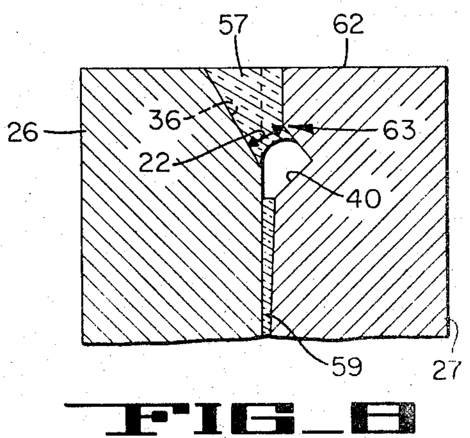
FIG. 8 is a cross section view of the bonded blocks of FIG. 7 taken along lines 9—9 thereof.

Additionally, groove 40 is positioned so as to leave a strip 51 of surface 41 adjacent top surface 42, wherein strip 51 has a height *h*, which is at least as great as the desired ultimate depth of the non-magnetic gap. In this instance, height *h* is selected to be significantly greater than the final gap depth, due to the manner in which the gap is finished as discussed herein. Finally, the dimensions of notches 29 and groove 40 are such that the bottom walls 36 of notches 29 intercept groove 40 near a middle to upper region thereof when the two blocks are moved into an assembled position as indicated by FIG. 4 with top surfaces 32 and 42 of the respective blocks flush with one another. The relationship between the bottom walls 36 of notches 29 and the location of groove 40 is best shown in FIGS. 6 and 8.

Working with blocks 26 and 27 selected to have the dimensions indicated above, it has been possible to construct block 26 with the shown fourteen notches and to provide a width of approximately 7 mils in this instance for each of lands 39. This width for lands 39 corresponds to the ultimate gap width $W_g$ as shown in FIG. 1 and the desired width of the recorded magnetic track. The width of each of notches 29 is slightly larger, being on the order of 18 mils, so as to accommodate the loss of material due to the thickness of a diamond blade used in slicing the block into a plurality of head segments as discussed herein and still leave approximately 3 to 4 mils of width on either side of lands 39 for glass pockets 15 and 16. The depth of notches 29 measured along surface 32 from edge 28 is selected to be on the order of 10 mils while the notch depth measured from edge 28 along surface 31 is on the order of 20 mils. Groove 40 of block 27 is positioned so as to leave a strip 51 of block surface 41 which forms the pole face of core member 14 and confronts lands 39 of block 26 to form each non-magnetic gap, such as gap 11 of FIG. 1.

Preferably, strip 51 is provided with a height *h*, for accommodating both the desired ultimate gap depth and a narrow band of a gap spacer material utilized in defining the desired length (space between pole faces) of each of gaps 11. The spacer material is later lapped off the top of bonded blocks 26 and 27. Typically, the elevation dimension *h* for strip 51 will be on the order of 20 mils. The penetration of groove 40 into the side of block 27 is selected to provide a suitably large winding window 21 to allow passage of windings 48 and 49 therethrough as shown by FIG. 1.

Referring to FIG. 4, once blocks 26 and 27 have been processed as set forth above, a band of spacer material is disposed between surface strip 51 of block 27 and lands 39 of block 26 adjacent surfaces 32 and 42 respectively thereof, and the two blocks are pressed together as indicated by arrows 52 while maintaining registration of the respective external block surfaces. In this instance, the band of gap spacer material is provided by a particle deposition process in which lower portions of lands 39 are masked and a film 53 of nonmagnetic deposited material is disposed on each of the exposed faces of the various lands by any one of several well known deposition techniques. The elevation dimension 54 of deposited film 53 is on the order of 10 mils in this instance. The thickness of the deposited gap spacing material can vary over a relatively wide range, such as from a few micro inches on up to several hundred micro inches depending upon the desired signal application of the resulting transducer. As the top portion of blocks 26 and 27 is later lapped to a depth coextensive with the band of deposited film 53, the actual manner by which the gap spacer is provided is not at all critical. It would be equally convenient to utilize a continuous length or strip of gapping material, such as a thin foil shim of glass or metal disposed adjacent edge 28 of block 26 overlying lands 39 to the desired depth 54 and thereafter pressing block 27 into place against the foil shim.

Figure 5:
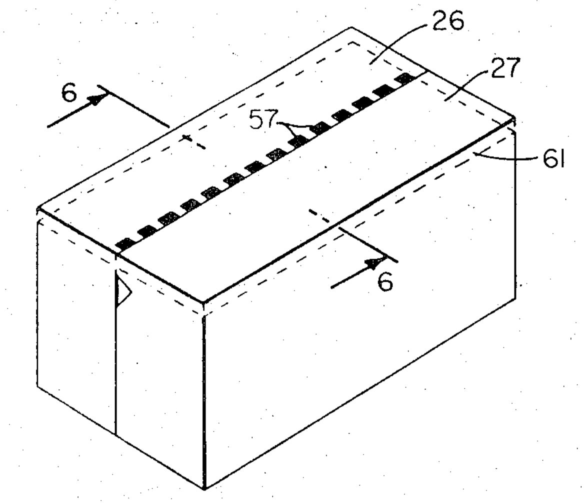
FIG. 5 is a further perspective view of the magnetic material blocks of FIGS. 2, 3 and 4 after the glass bonding operation has been completed.

With reference to FIGS. 4, 5 and 6, blocks 26 and 27 are held firmly together, for example by a suitable holding fixture (not shown) and a source of glass bonding material, here in the form of a rod 56 of glass material, is disposed lengthwise within the window bounded by groove 40 of block 27 and the surface 31 of block 26 ay indicated. The assembly is thereupon disposed in an oven. The glass material of rod 56 has a known melting temperature, which in this instance is around 550° centigrade. The oven, which has a non-oxidizing atmosphere, is slowly increased in temperature up to a plateau level above the melting point of the glass rod, in this instance around 690° centigrade, and thereafter slowly decreased back down to room temperature. The rise, plateau and fall of the heating process should take around four hours with the plateau temperature lasting around 35 minutes.

As the glass begins to melt, it flows into notches 29, by what is believed to be primarily a capillary action, to form pockets of glass 57 as shown in FIG. 5. Eventually, these glass filled regions become glass pockets 15 and 16 of FIG. 1. Concurrently with the filling of notches 29, the glass melt flows by capillary attraction into the plurality of relatively small free spaces 58 defined by the exposed faces of lands 39 below film 53 and the confronting face of strip 51 of block 27. In this manner, the glass flows so as to bond the confronting pole faces of lands 39 and strip 51 up to the lower edge of film 53 of gap spacer material, as best shown by FIG. 6. It has been found that by virtue of the glass melt occurring on both sides of each of lands 39 that the capillary movement of the melt into the actual gap region is significantly enhanced. Thus, there have been fewer rejects due to inclusions of air voids within the glass bonded non-magnetic gap.

It has been found that the dimension of region 22 as shown by FIG. 8 is critical in that too large a passage at this point discourages the capillary flow of the glass melt from reaching the notch voids. In particular, a span in the range of 2–5 mils across passage region 22 has been found to be suitable.

With reference to FIGS. 6 and 8, the placement of gap spacer film 53 near the top edges of the pair of blocks causes the confronting surfaces 31 and 41 of the respective blocks to define a slight wedge shaped free space (exaggerated for clarity) not only in the region of the non-magnetic gap above groove 40, shown as space 58, but also below groove 40 to the rear of the head. This free space region, shown at 59, below groove 40 is similarly filled with glass melt by capillary attraction and forms a glass bond holding these lower portions of the core members securely together.

The bonded block assembly is now in a condition as shown by the solid lines of FIGS. 5 and 6 with the assembly having been removed from the oven and the glass having resumed a hardened state. At this stage, a top portion 61 of the bonded blocks defining surfaces 32 and 42 is lapped off by an amount approximately coextensive with the elevation dimension 54 of the original spacer material film 53. Accordingly, film 53 is entirely removed leaving a non-magnetic gap and notch region comprised entirely of a single homogeneous body of glass material integrally bonded with the ferrite core members.

Figure 7:
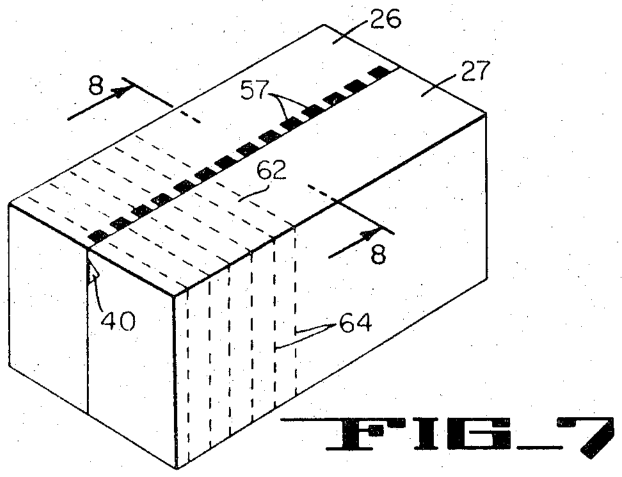
FIG. 7 is a perspective view of the bonded blocks of FIG. 5 subsequent to the completion of a face lapping operation and at a fabrication stage at which the blocks are ready to be sliced or cut into the individual head segments.

The structure as it appears with the top portion 61 removed is shown by FIGS. 7 and 8. As best shown by FIG. 8, the glass in pockets 57 extends flush with surface 62 and passes through region 22 to a point adjacent the lower edge of wall 36 and the lower most point 63 of the non-magnetic gap.

The strength of the glass bond to the ferrite material is particularly important due to the fact that the bonded blocks are sliced into a plurality of sections, indicated by dotted lines 64 on FIG. 7, leaving the glass formations in each of the various pockets without lateral support, as indicated by pockets 15 and 16 on head 10 of FIG. 1. The cutting or slicing operation in this instance is performed by a diamond saw blade which is guided to pass through the bonded blocks along planes bisecting each of the glass filled pockets 57. Each sliced segment resulting from this operation, except for the two end slices, provides a head configuration as shown for head 10 in FIG. 1. The crude head derived from this operation need merely be contoured along its surface 62, which carries the non-magnetic gap, so as to form a face 17 as shown for head 10, and thereafter provided with windings, such as windings 48 and 49 of head 10. In conjunction with the contouring of surface 62 many times it will be desirable if not necessary to remove a sufficient amount of material from surface 62 such that a desired gap depth is achieved. The gap depth may be determined by observation under a microscope and is measured from the top surface corresponding to surface 62 in FIG. 8 down to the bottom of the non-magnetic gap indicated at point 63, which also corresponds to the top of groove 40.

Figure 9:
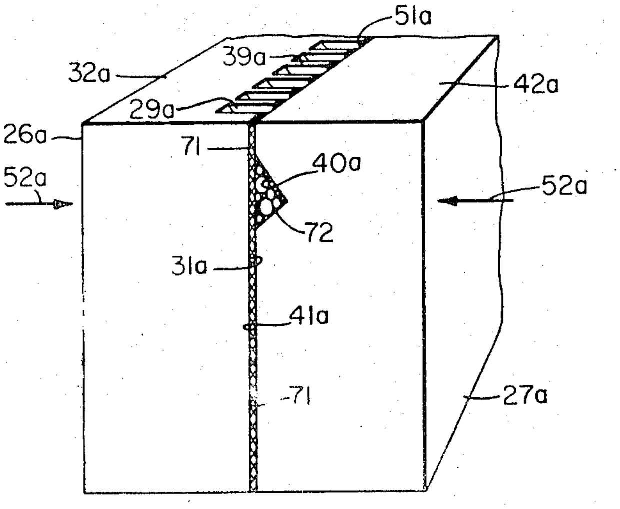
FIG. 9 is a perspective view of a pair of processed blocks illustrating an alternative method by which the magnetic head of FIG. 1 may be fabricated.

An alternative construction of the magnetic head is illustrated by FIG. 9 which shows a pair of ferrite blocks **26*a* and 27*a* being prepared for the bonding operation. Here, blocks 26*a* and 27*a* correspond to the blocks of like reference numbers in FIGS. 2 and 3 and at a stage in the manufacturing sequence corresponding to FIG. 4. In this instance, the non-magnetic gap spacing is achieved by inserting a relatively thin glass shim 71 between the confronting faces 31*a* and 41*a*** of the respective blocks and placing the assembly in a holding fixture (not shown).

Typically, shim 71 may have a thickness from 25 to 100$\mu$ inches.

At this stage, a plurality of glass rods 72 are inserted longitudinally within a groove **40*a* as indicated, wherein the diameters of the various rods 72 are intentionally unequal such that a maximum amount of glass material can be stored within the groove. Due to the irregular shape of groove 40*a*, a greater amount of glass can be positioned in this manner as compared with the use of a single large diameter glass rod, such as rod 56 as shwon in connection with FIG. 4. It will be appreciated that the plurality of differently sized glass rods 72 as employed in FIG. 9 can be used to equal advantage in the fabrication step illustrated and described above in connection with FIG. 4. In both cases, the objective is to provide an adequate amount of glass melt for a one step bonding operation for filling the relatively large free space regions created by notches 29 and 29*a* without requiring a larger than desired groove 40 (or 40*a***) and resulting winding window.

When the various constituents have been arranged as shown by FIG. 9, the assembly is disposed in an oven as in the case of the assembled blocks shown in FIG. 4 and the process thereafter proceeds in a manner similar to that described above. The characteristics of the glass material comprising shim 71 are such that its melting temperature is somewhat higher than that of glass rods 72 and the maximum temperature to which the assembly is subjected within the oven is selected to lie between the melting points of the glass rods and that of the shim material. In this manner, upon reaching the maximum oven temperature, the glass material within rods 72 becomes molten and flows into the free spaces created by notches **29*a* while at the same time shim 71 attains only a softened condition and thus continues to maintain a finite gap separation between lands 39*a* and strip surface 51*a* of blocks 26*a* and 27*a* respectively. The portion of shim 71 spanning the lands 39*a* and otherwise isolating the glass source in groove 40*a* from notches 29*a*, if not initially ruptured upon inserting the glass rods, is caused to melt or soften to a sufficient extent to allow the glass melt from the source rods to pass up into the free space notch regions. During the heating operation, the glass melt from rods 72 bonds with the ferrite material and with the softened glass of shim 71, while the glass of shim 71 in turn bonds to the confronting faces of the ferrite blocks. Upon completion of this operation, blocks 26*a* and 27*a* are in a stage similar to that of blocks 26 and 27 of FIG. 7. A suitable amount of material may be lapped off the top surfaces 32*a* and 42*a* of the respective blocks to approach the desired gap depth prior to the slicing operation which is effected in the same manner as described in connection with FIG. 7. Finally, the sliced head segments may be finished to the condition shown for head 10 in FIG. 1 in the same manner as described above in connection with FIGS. 7 and 8**.

What is claimed is:

1. A method of constructing a magnetic transducer having a functional non-magnetic gap formed between a pair of complementary magnetic core halves, the steps comprising:

forming a plurality of spaced parallel notches extending into a block of magnetic material only between intersecting surfaces thereof to define a plurality of outwardly facing lands, one of said surfaces being planar;

forming an elongate groove in a plane surface of another block of magnetic material;

holding said blocks in confronting spaced apart relationship with said planar surfaces in opposition so that a portion of said elongate groove confronts a portion of each of said notches at said lands to form communicating free space regions between the confronting blocks in said notches, in said groove and between the planar surfaces;

filling the free space regions between said confronting planar surfaces, in said notches and in at least a part of said groove with glass, said glass forming an integral structural unit bonded to said planar surfaces and the walls of said notches and groove; and slicing said blocks along planes parallel to and substantially bisecting each of said spaced parallel notches to form a plurality of individual transducers each having a pair of magnetic core halves with a nonmagnetic glass gap therebetween and having glass pockets on the side of the glass gap, said glass pockets and the glass between said core halves, including said glass gap, forming an integral structural unit.

2. The method of constructing a magnetic transducer in accordance with claim 1 wherein said notches are formed to extend from said planar surface to a second planar surface, said second planar surface being normal to said planar surface and coinciding with the face part of the transducers to be formed.

3. The method of constructing a magnetic transducer in accordance with claim 2 wherein said step of filling the free space regions is accomplished by the steps of disposing glass material within said elongate groove;

heating said glass material to a temperature at which said glass material melts and flows into said free space regions between said confronting planar surfaces and into said free space regions in said notches; and cooling said glass material to bond said glass material to said planar surfaces and said walls of said notches.

4. The method of constructing a magnetic transducer in accordance with claim 3 wherein said step of holding said blocks in confronting spaced apart relationship is accomplished by positioning said blocks so that the bottom walls of said notches emerge from said planar surface of the first named block substantially midspan of the elongate groove carried by said planar surface of the second named block whereby a passage is formed between the upper region of said groove and the bottom wall of said notches for communicating glass melt between the free space region defined by said groove and said free space regions in said notches.

5. The method of constructing a magnetic transducer in accordance with claim 4 wherein said passage has a maximum dimension in the range of 2 to 5 thousandths of an inch in order to optimize capillary flow characteristics.

6. The method of constructing a magnetic transducer in accordance with claim 5 wherein the amount of glass material disposed within said groove is selected to substantially equal the volume of said free space regions between said confronting planar surfaces and said free space regions in said notches so that the heating and cooling steps result in the flow of glass material to said free space regions with the resultant formation of an open region in said groove defining a window adapted to receive transducer windings.

7. The method of constructing a magnetic transducer in accordance with claim 2, wherein said step of filling the free space regions is accomplished by the steps of disposing a spacer material between said confronting blocks above the level of said elongate groove to define the length of said functional non-magnetic gap;

disposing glass material within said elongate groove;

heating said glass material to a temperature at which said glass material melts and flows into said free space regions between confronting planar surfaces up to the level of said spacer material, and flows into said free space regions in said notches;

cooling said glass material to bond said glass material to said walls of said notches and said planar surfaces; and lapping the second planar surface face part side of said combined blocks so that said spacer material is removed and said glass between said confronting planar surfaces is exposed to form a glass transducing gap on the face part of the transducers to be formed.

8. The method of constructing a magnetic transducer in accordance with claim 7 wherein said gap spacer material comprises a solid band.

9. The method of constructing a magnetic transducer in accordance with claim 8 wherein said gap spacer material is applied to at least one of said blocks prior to said holding step, said material being applied above the level of said elongate groove by a particle deposition process.

10. The method of constructing a magnetic transducer in accordance with claim 9 wherein the amount of glass material disposed within said groove is selected to substantially equal the volume of said free space regions between said confronting planar surfaces and the free space regions in said notches so that the heating and cooling steps result in the flow of glass material to said free space regions with the resultant formation of an open region in said groove defining a window adapted to receive transducer windings.

11. The method of constructing a magnetic transducer in accordance with claim 10 wherein said glass material is in the form of a plurality of glass rods disposed longitudinally within said groove, said glass rods having selectively different cross sections in order to minimize the storage space required by said glass material so that an undesirably large groove is not required in said second named block.

12. The method of constructing a magnetic transducer in accordance with claim 2 wherein said step of filling the free space regions is accomplished by the steps of disposing glass material within said elongate groove;

disposing a glass shim between said confronting planar surfaces above the level of said elongate groove of said block, said glass shim having a melting temperature higher than the melting temperature of said glass material disposed in said elongate groove, and heating said glass material in said elongate groove to a temperature at which it melts and flows into said free space regions between said confronting planar surfaces up to the level of said glass shim and flows into the free space regions in said notches, said temperature being below the melting point of said glass shim so that said glass shim softens to create a bond between said glass shim and said confronting planar surfaces, and said glass shim and said glass material merge into an integral structural unit.

* * * * *